United States Patent Office 3,187,254
Patented June 1, 1965

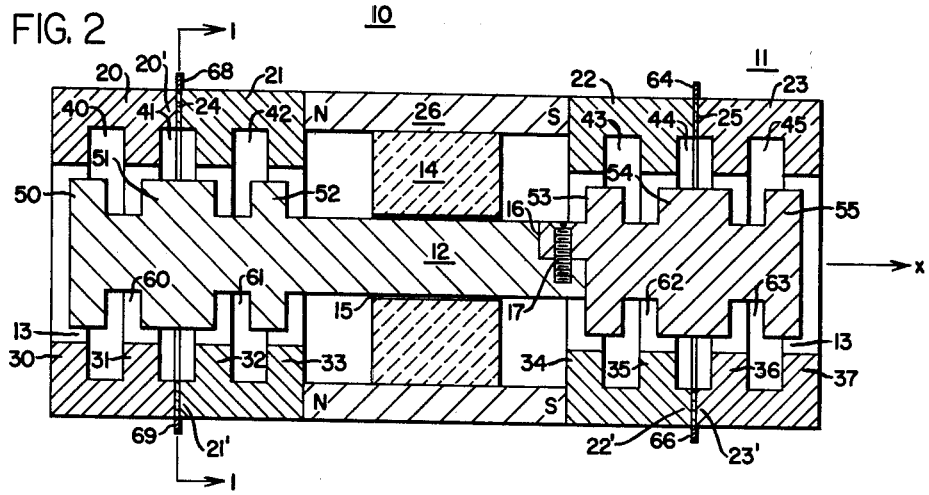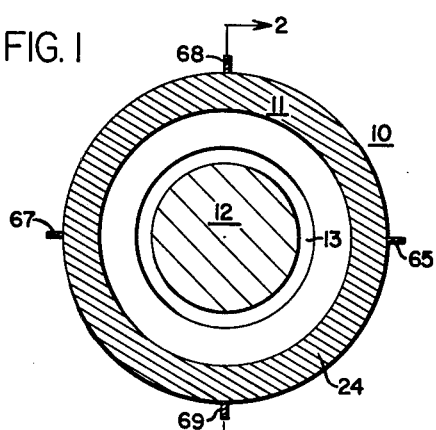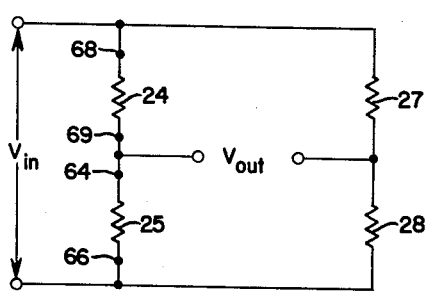

3,187,254
CONTROL APPARATUS WITH MAGNETO-RESISTIVE PICKOFF MEANS
Seymour N. Wasserman, Natick, Mass., assignor to Honeywell Inc., a corporation of Delaware
Filed Apr. 6, 1961, Ser. No. 101,236
3 Claims. (Cl. 324—45)

This invention relates to pickoffs, and more particularly to pickoffs utilizing metals having the property of varying electrical characteristics in relation to a variation in a magnetic flux passing therethrough.

Electric properties of certain materials can be varied by passing a varying magnetic flux through them. Materials having this property are known as magnetoresistive materials and an example of a magnetoresistive material is bismuth. When a varying magnetic flux is passed through a strip of bismuth the resistivity varies in relation to the variations of the flux. The present invention improves upon devices that utilize this variation of the resistivity to produce an indication of the amount and direction of movement. Another property closely related to this change of resistivity is a variable voltage known as the Hall voltage.

In a flat portion of magnetoresistive material, if a constant current is applied to the material through two contacts in a line in the same plane as the face of the material into which the flux is flowing, a voltage, known as the Hall voltage, can be picked off from two contacts in a line which is mutually perpendicular to the direction of the flow of flux into the face of the material and the line formed by the current terminals. This voltage will vary in direct relation to the variations of the flux passing through the material. The Hall voltage is an alternative property which may be used in the present invention in place of the varying resistivity.

Prior art pickoffs utilize a change in the area of the magnetoresistive material which is in the flux field. In general these pickoffs operate by having the magnetoresistive material form a moving member or it is connected directly to the seismic mass of an accelerometer and as an acceleration or movement causes a force to be exerted on the movable member more of the magnetoresistive material enters the flux path and the resistivity changes. However, there are several major problems connected with these devices.

The resistance change of the magnetoresistive material, in the prior art pickoffs, is not linear since, generally, the flux remains the same but the area of the magnetoresistive material increases. This means that the same amount of flux per unit area is passing through the material, but there is a change of resistance because of the change of area through which the flux is passing. This makes the prior art devices very difficult to calibrate. The calibration becomes even more difficult if the flux increases and the area of the magnetoresistive material increases simultaneously.

Another major problem in the prior art devices is flux leakage. Because of flux leakage in the air gap and the resistivity of the material conducting the flux it is extremely difficult to obtain a uniform flux field across an air gap. Thus, as the magnetoresistive material moves in the air gap a small acceleration may cause a given change of resistivity of the material but a large acceleration does not necessarily cause a proportional change in the resistivity. Also, because of this nonuniform flux field, a small change in the area might cause such a small change in the total resistance of the material that it would be very difficult to detect. Thus, the prior devices were relatively insensitive, as well as inaccurate.

In the present invention two films of magnetoresistive material are placed in the flux path and the configuration is such that a movable member moving in one direction increases the flux through one film and decreases it through the other film, and by moving in the other direction it acts in the opposite manner. These two films of magnetoresistive material are then electrically connected as two legs of an electrical bridge. By applying a voltage to the input of the bridge an output voltage will be of one sense as movement occurs in one direction and of the other sense for a movement in the other direction. Also, the amplitude of the output will vary with the amount of movement. The accuracy of the indication will depend principally upon the accuracy of the bridge and the accuracy of the voltage applied, and the amplitude of the output will depend upon the amplitude of the voltage applied. Also, all voltages are applied or picked off the stationary member of this device. The inner movable member is constructed so that it may be continuously rotated and there need be no friction or axial restraint other than that in the mounting means which well may be a gas bearing. Thus a small, accurate pickoff, the rotor of which may be continuously rotated, can be easily and cheaply constructed.

Accordingly it is an object of this invention to provide an improved pickoff.

Another object of this invention is to provide a pickoff with a movable member that can be rotated continuously and which is free of friction and axial restraint.

Another object of this invention is to provide a pickoff capable of miniaturization.

Another object of this invention is to provide a pickoff which is simpler and cheaper to construct.

These and other objects of the present invention will be understood upon consideration of the accompanying specification, claims, and drawings of which:

FIGURE 1 is a cross sectional end view of the pickoff along section line 1—1 of FIG. 2;

FIG. 2 is a cross sectional view along section line 2—2 of FIG. 1; and

FIGURE 3 is a schematic representation of a bridge circuit with the variable resistances of the pickoff included.

Referring to FIGURE 1, the reference numeral 10 generally designates a pickoff which could be used as an axial motion detecting pickoff for a hydrodynamically supported accelerometer such as that disclosed in the copending application of Leonard P. Entin, Serial No. 76,038, filed December 15, 1960, and assigned to the same assignee as the present application.

Referring to FIGURE 2, the pickoff 10 comprises a relatively stationary outer shell or housing or stator 11 having a generally hollow cylindrical configuration. The pickoff 10 also includes a relatively movable member or armature member 12 having a general cylindrical configuration with a longitudinal axis X and positioned within the outer shell 11. As shown in FIGURE 1, the movable or armature member 12 is concentrically positioned within the outer shell or stator member 11 defining a uniform annular air gap 13 therebetween.

Any suitable means may be provided for supporting armature or inner member 12 for relative axial movement with respect to housing member 11. The supporting means disclosed represents a hydrodynamic gas bearing analogous to that disclosed in said copending application of Leonard P. Entin. The armature or inner member 12 in the present pickoff may be considered as part of the rotating seismic mass element in the accelerometer disclosed in said Entin application although the specific means for rotating the armature element 12 about its longitudinal axis X has not been shown since it forms no part of the present invention. A bearing element 14 having a central aperture 15 therethrough coacts with the central portion of the armature or movable member 12 to provide support for the armature permitting relative axial movement between stator 11 and armature 12 along axis X.

Armature member 12 may be cut along a line 16, shown in FIGURE 2, and bearing element 14 can then be assembled on the shaft portion. Once bearing element 14 is assembled on the shaft portion, armature 12 can be reassembled and held together by some convenient means such as drilling and tapping a hole and inserting a screw 17. This is only one method of assembly and it is readily apparent that anyone skilled in the art could devise many other methods of assembly.

While the present invention has been disclosed with the armature member 12 adapted to be rotated about its longitudinal axis X, it will be understood that the scope of the invention also covers nonrotating arrangements.

The stator or housing or outer shell 11 includes a plurality of separate hollow cylindrical or ring shaped portions. More specifically the stator 11 includes four hollow cylindrical or ring shaped magnetic pole portions 20, 21, 22 and 23. The stator 11 also includes a ring shaped permanent magnet 26, the bearing element 14 being centrally positioned within the bore of the magnet 26.

Each of the magnetic pole portions 20-23 has a ring-like configuration with a cylindrical outer surface and with a pair of axially spaced inwardly extending circumferential shoulders or flanges. Thus pole member 20 has shoulders or flanges 30 and 31; member 21 has shoulders or flanges 32 and 33; member 22 has shoulders or flanges 34 and 35; and member 23 has shoulders or flanges 36 and 37. Generally the members 20-23 are identical to one another, each of them having an axially extending shoulder or rim. The rims for the members 20-23 are identified respectively by the reference numerals 20', 21', 22' and 23'.

The magnetic portions 20 and 21 are arranged at one end of the stator 11 in general axial abutting relationship. More specifically the rim portion 20' of member 20 is adjacent to the rim portion 21' of member 21, a ring shaped grid or film of a suitable magnetoresistive material 24 being positioned between the rims 20' and 21'. Thus, three circumferential grooves 40, 41 and 42 are formed in magnetic pole portions 20 and 21, groove 40 being between shoulders 30 and 31, groove 41 being between shoulders 31 and 32 and groove 42 being between shoulders 32 and 33. The assembled members 20, 21 and the interposed grid or film 24 are co-axially abutted against one axial end of the ring shaped permanent magnet 26. Co-axially abutting the other end of the magnet 26 is a similar assembly of the remaining two magnetic portions 22 and 23 and a second grid or film 25 of magnetoresistive material. The film 25 is positioned between the rims 22' and 23' respectively of the portions 22 and 23. Magnetoresistive films 24 and 25 may be made up of any material, for example, bismuth, which has the characteristic of a varying resistivity with a varying flux therethrough.

Suitable means such as a suitable adhesive or an additional outer housing, not shown, are provided for maintaining all of the individual components of the stator 11 in rigid or fixed assembled relationship. Also, a permanent magnet is used in this preferred embodiment for simplicity in the explanation and drawings. However, it should be remembered that any flux producing means could be used in this position.

In FIGURE 2 it can be seen that armature member 12 has a solid cylindrical configuration slightly shorter axially than the stator assembly 11 already explained. The armature member 12 has six circumferential shoulders 50, 51, 52, 53, 54, and 55. The left edge of shoulder 50 is even with the left end of armature member 12. Shoulder 51 is spaced axially so as to form a circumferential groove 60 between it and shoulder 50, and shoulder 52 is spaced axially so as to form a circumferential groove 61 between it and shoulder 51. The right edge of shoulder 55 is even with the right end of armature member 12. Shoulder 54 is spaced axially so as to form a circumferential groove 63 between it and shoulder 55 and shoulder 53 is spaced axially so as to form a circumferential groove 62 between it and shoulder 54.

The outer diameter of armature member 12 is slightly smaller than the inner diameter of bearing element 14 and armature member 12 rides within bearing element 14 so that it is supported for rotational and axial movement. Bearing element 14 fits between shoulders 52 and 53 which are axially spaced apart sufficiently to allow axial movement of armature member 12. Shoulders 50–55 have an outer diameter which is slightly smaller than the inner diameter of shoulders 30–37 on magnetic pole portions 20–23 and bearing element 14 supports armature member 12 so as to define the uniform air gap 13 between the shoulders 50–55 and 30–37.

FIGURE 3 is a schematic representation of an electrical bridge network. Magnetoresistive films 24 and 25 have been depicted as resistances and are shown connected in two legs of the bridge circuit. Terminals 68 and 69 are shown as connection points on either side of the resistance depicting magnetoresistive film 24 in FIGURE 3. The mechanical terminals can be seen in FIGURES 1 and 2 and may be any convenient terminal means whereby an electrical connection may be made to magnetoresistive film 24. Terminals 64 and 66 are connection points for magnetoresistive film 25 and are shown schematically in FIGURE 3 and mechanically in FIGURE 2. Resistors 27 and 28 in the other two legs of the bridge are precision resistors each having a value equal to the value of the resistance of magnetoresistive films 24 or 25 when the movable member 12 is in the null position.

Terminals 65 and 67, shown in FIGURE 1, are two additional electrical connections to magnetoresistive film 24. As can be seen in FIGURE 1, they are in a line which is mutually perpendicular to a line through terminals 68 and 69 and the direction of the flow of flux through magnetoresistive film 24. The connection for the electric bridge circuit in FIGURE 3 was made between terminals 68 and 69 but it should be noted that magnetoresistive film 24 could have been conducted into the electrical bridge circuit equally as well by using terminals 65 and 67. Magnetoresistive film 25 also has an extra pair of terminals in a line mutually perpendicular to terminals 64 and 66, and to the direction of the flow of flux through film 25. These terminals cannot be seen in the drawings. The extra pairs of terminals on each of the magnetoresistive films 24 and 25 are provided so that the Hall effect may be utilized. As explained more fully later, by applying a constant current to either of the pairs of terminals, for example 65 and 67, on the magnetoresistive films, in this case film 24, a Hall voltage can be picked off from the other set of terminals, in this example 68 and 69, on that film.

*Operation*

Ring magnet 26 will cause flux flow from the north pole to magnetic portions 21 and 20, across the air gap into the rotor, through the rotor, across the air gap into magnetic portions 23 and 22 and into the south pole. This flux will be distributed in the following manner. When the movable member 12 is in the null position, as shown in FIGURE 2, flux will flow out of the north pole of ring magnet 26 into portions 21 and 20. Portions of flux will flow from shoulder 30 across the air gap to shoulder 50 on the movable member, from shoulder 31 to shoulder 51, from shoulder 32 to shoulder 51, and from shoulder 33 to shoulder 52. The flux then flows from the left end of movable member 12 to the right end. Portions of flux will then flow across the air gap from shoulder 53 to shoulder 34, shoulder 54 to shoulder 35, shoulder 54 to shoulder 36, and shoulder 55 to shoulder 37. The flux then flows from portions 22 and 23 back into the south pole of ring magnet 26 to complete the circuit. It will be noted that in this null position of movable member 12 approximately the same amount of flux is flowing through magnetoresistive film 24 as is flowing through magnetoresistive film 25. This means that film 24 and film 25 will have approximately the same resistance.

Now assume that a movement or acceleration causes movable member 12 to move in the positive X direction, or to the right, as far as it is allowed to go. That is, the right end of movable member 12 is approximately even with the right end of outer shell 11. In this position shoulders 51, 52, 54, and 55 of movable member 12 are directly opposite shoulders 32, 33, 36 and 37 respectively, of outer shell 11. Also, grooves 40, 41, 43, and 44 of outer shell 11 will be directly opposite shoulders 50, 51, 53 and 54, respectively, of movable member 12. Thus, there will be a maximum reluctance between portions 20 and member 12 and portion 22 and member 12 while the reluctance between portion 21 and member 12 and portion 23 and member 12 is at a minimum. The flux path will now be from the north pole of ring magnet 26 to portion 21, across the air gap 13 to movable member 12, through movable member 12 and across air gap 13 again to portion 23, through magnetoresistive film 25, through portion 22 and back to the south pole of ring magnet 26.

In this position, with movable member 12 at its extreme right, except for a small leakage flux, no flux will flow through the magnetoresistive film 24 while practically all of the flux crossing air gap 13 will flow through magnetoresistive film 25. Thus, film 24 has a minimum resistance and film 25 has a maximum resistance.

If a movement or acceleration should cause movable member 12 to move to the left or in the negative X direction the following flux distribution would occur. At the left end of pickoff 10 shoulders 30 and 50 and 31 and 51 would be more closely aligned, and shoulders 32 and 51 and 33 and 52 would be farther out of alignment in the longitudinal axis. This means that more flux would flow across the air gap from portion 20 to movable member 12 and less flux would flow from portion 21 to movable member 12, thus, causing a larger flow of flux through magnetoresistive film 24 and raising its resistance. At the right end of pickoff 11 shoulders 53 and 34 and 54 and 35 would be more closely aligned and 54 and 36 and 55 and 37 would be farther from alignment. Thus more flux would flow from movable member 12 to portion 22 and less flux would flow to portion 23. Therefore there would be less flux flow through magnetoresistive film 25 causing its resistance to go down.

It should be noted that any small increment of movement toward the right will cause less flux to flow through film 24 and more flux to flow through film 25, and any small increment of movement toward the left will cause more flux to flow through film 24 and less flux to flow through film 25. Therefore, the resistance of film 24 will increase linearly as movable member 12 moves from its maximum right position to its maximum left position while the resistance of film 25 decreases linearly, and the opposite occurs for movement from left to right. Because movable member 12 causes a change of flux flow through one film with every lateral movement and an opposite change of flux flow through the other film simultaneously, any variations in the flux field in air gap 13 are counteracted, and an extremely accurate and linear pickoff is provided. In the preferred configuration depicted in FIGURES 1 and 2 the area of the magnetoresistive film in the flux path remains the same at all times. However, because of the position of the shoulders and grooves on both the movable member 12 and the outer shell 11 even the slightest longitudinal movement of member 12 causes a large change in the amount of flux flowing through the magnetoresistive films. Hence, a very sensitive pickoff is provided.

FIGURE 3 shows one possible application of the change of resistance of magnetoresistive films 24 and 25. In FIGURE 3 films 24 and 25 are depicted as two legs of an electrical bridge network. The other two legs of the bridge have precision resistors 27 and 28 in them. Resistors 27 and 28 have approximately the same resistance as magnetoresistive films 24 and 25 when movable member 12 is in the null position. By applying the proper voltage at the input terminals designated as $V_{in}$ in FIGURE 3 an output voltage may be obtained at the output terminals designated $V_{out}$ which will vary with the movement of movable member 12. Because the resistance of film 24 goes down when the resistance of 25 goes up and vice versa the voltage output of the bridge network will be twice as sensitive as it would be if one magnetoresistive film were used. Also, any magnetic forces on one end of movable member 12 will be nulled by an equal and opposite force on the other end. The amplitude of the output voltage $V_{out}$ is dependent upon the amplitude of the input voltage $V_{in}$ and does not place any restrictions on the size or form of pickoff 10. There are no windings or brushes or other mechanical connections with movable member 12 to cause friction and to distort the movements as in previous pickoffs. Thus, it can be seen that the output voltage is dependent upon the magnitude and stability of the input voltage and upon the precision of the bridge network.

Another possible application of the varying characteristics of the magnetoresistive films 24 and 25 would be to pick off a voltage known as the Hall voltage. By applying a current from a constant current source to terminals 65 and 67 shown in FIGURE 1, a voltage known as a Hall voltage may be obtained from terminals 68 and 69. This Hall voltage on terminals 68 and 69 is directly proportional to the amount of magnetic flux passing through the magnetoresistive film 24 longitudinally, that is, from portion 21 to portion 20. In this application with movable member 12 moved to the left a voltage which is above null would be present between terminals 68 and 69 and a voltage which is below null would be present between terminals 64 and 66. Conversely, if movable member 12 moved to the right a voltage below null would be available between terminals 68 and 69 and a voltage above null would be available between terminals 64 and 66. Since a small increment of movement causes the Hall voltage on terminals 64 and 66 to increase or decrease and the Hall voltage on terminals 68 and 69 decreases or increases the same amount a push-pull effect is produced. Thus, these two voltages taken together would be twice as sensitive for determining movement of movable member 12 as either one of them separately. Also, the size of the voltages would depend solely upon the external constant current source applied to the terminals 65 and 67 on magnetoresistive film 25 and two similar contacts, not shown, on magnetoresistive film 24, and to the magnetic strength of the ring magnet 26. It should be noted in both of these cases that movable member 12 will have no additional weight or forces on it due to such things as brushes, windings, etc. Also, the entire pickoff 10 can be made very small due to the fact that the amplitude of the output voltage is dependent upon the amplitude of the input voltage which is applied to the external bridge circuit.

Thus, this invention provides a highly sensitive pickoff capable of being miniaturized. The movable member of this pickoff is capable of high speed rotation such as in gas bearing accelerometers of the type depicted in the referenced Entin application and there are no outside forces on it to cause transient signals. The amplitude and to a large extent the accuracy of the output signal are due to the amplitude and accuracy of external devices making the design and production of this pickoff cheap and simple. Also, because of a constant area of magnetoresistive material in the flux path and a varying amount of flux this pickoff is highly sensitive.

It should be understood that the scope of the invention covers having the flux producing means on the rotating member as an alternative arrangement to that shown. It should also be understood that while this preferred embodiment shows the inner member rotatable and the outer member stationary the invention could be constructed equally well with the outer member rotatable and the inner member stationary. In this case the magnetoresistive elements would be included in the stationary inner member. This constitutes a reversal of the functions of the two members and all of the construction features and advantages of this invention would apply to this modification as well.

While I have shown and described a specific embodiment of this invention, further modification and improvements will occur to those skilled in the art. I desire it to be understood, therefore, that this invention is not limited to the particular form shown and I intend in the appended claims to cover all modifications which do not depart from the spirit and scope of this invention.

What I claim is:

1. Control apparatus, comprising:
    (a) a rigid cylindrical housing member with first and second ends having a longitudinal bore therethrough, and comprising a first magnetic section at said first end, a second magnetic section at said second end, and a third magnetized section mounted between said first and second sections; said first and second sections each comprising a pair of cylindrical portions having a plurality of raised circumferential flanges formed thereon perpendicular to said bore and extending into said bore;
    (b) a first cylindrical magnetoresistive element mounted between said portions of said first section; a second cylindrical magnetoresistive element mounted between said portions of said second section; said magnetoresistive elements being characterized by a change of resistivity with a change of magnetic flux therethrough;
    (c) a cylindrical bearing member mounted within said bore on said third section;
    (d) an elongated armature member constructed from a magnetic material and comprising first and second opposing end portions and a central bearing portion separating said end portions; said armature member being mounted in said bore with said bearing member surrounding said bearing portion to prevent lateral movement of said armature member in said bore while allowing longitudinal movement therein; said first and second end portions each having a plurality of raised circumferential flanges formed thereon generally opposite said corresponding flanges on said housing member; said flanges on said armature member having an outside diameter that is slightly smaller than the inside diameter of said flanges on said housing member whereby first and second variable air gaps are provided between said opposite flanges; said housing member and said armature member defining a series magnetic circuit from one pole of said magnetized third section to the other pole thereof including said first section, said first air gap, said first end portion, said bearing portion, said second end portion, said second air gap and said second section; the magnetic flux in said circuit thereby passing through said magnetoresistive elements and through said opposite flanges; the longitudinal movement of said armature member in said bore causing a change in magnetic reluctance between opposite flanges as said first and second air gaps are changed to thereby change the flow of magnetic flux through said magnetoresistive elements; and
    (e) means connected to said magnetoresistive elements to detect the change in resistance thereof as an indication of the degree of movement of said armature member with respect to said housing member.

2. Control apparatus, comprising:
    (a) an elongated housing member with first and second ends having a longitudinal bore therethrough, and comprising a first magnetic section at said first end, a second magnetic section at said second end, and a third section mounted between said first and second sections; said first and second sections each having two separate portions with each portion having a plurality of raised circumferential flanges formed thereon extending into said bore;
    (b) a first magnetoresistive element mounted between said portions of said first section; a second magnetoresistive element mounted between said portions of said second section; said magnetoresistive elements being characterized by a change of resistivity with a change of magnetic flux therethrough;
    (c) a bearing member mounted within said bore on said third section;
    (d) an elongated armature member constructed from a magnetic material, comprising first and second opposing end portions and a central bearing portion separating said end portions; said armature member being mounted in said bore with said bearing member guiding said bearing portion to prevent lateral movement of said armature member in said bore while allowing longitudinal movement therein; said first and second end portions each having a plurality of raised circumferential flanges formed thereon generally opposite said flanges on said housing member; said flanges on said armature member having an outside diameter that is slightly smaller than the inside diameter of said flanges on said housing member whereby first and second variable air gaps are provided between said opposite flanges;
    (e) flux producing means mounted in said apparatus to provide magnetic flux in a series magnetic circuit including said first section, said first air gap, said first and second end portions, said second air gap, said second section and said third section; the magnetic flux in said circuit thereby passing through said magnetoresistive elements, said first and second variable air gaps, and said opposite flanges; the longitudinal movement of said armature member in said bore causing a change in the relative positions of said opposite flanges to thereby vary said first and second air gaps and change the flow of magnetic flux through said magnetoresistive elements; and
    (f) means connected to said magnetoresistive elements to detect the change in resistance thereof to indicate the movement of said armature member with respect to said housing member.

3. Control apparatus, comprising:
    (a) an outer tubular shell having a first and a second magnetic section; said first and second section each including first and second portions;
    (b) first and second films of magnetoresistive material; one of said films being located in abutting relationship between said portions of each of said sections; said magnetoresistive material being characterized by a change in the resistivity with a change in the flow of magnetic flux therethrough;
    (c) an inner member of magnetic material having a length approximately equal to the length of said outer shell;
    (d) means for mounting said inner member for relative axial movement within said outer shell; said inner member in a normal position having equal surface areas thereon opposite each of said portions of said outer shell to define first and second variable air gaps between said inner member and said portions;
    (e) magnetic flux producing means mounted between said first and said second section to provide a flow of flux through a series magnetic circuit; said magnetic circuit including said flux producing means, said first section, said first air gap, said inner member, said second air gap and said second section; the flow of flux through at least one of said sections and thereby through said corresponding magnetoresistive film being changed by the longitudinal movement of said inner member with respect to said outer shell since the surface area of said inner member opposite said one section is altered to thereby alter the variable air gap and the magnetic circuit area; and (f) means for detecting the change of resistance of said magnetoresistive films caused by the change of flux flow through said altered magnetic circuit area as an indication of the degree of movement of said inner member relative to said outer shell.

References Cited by the Examiner
UNITED STATES PATENTS 2,712,601  7/55  Reinwald.
3,025,461  3/62  Snellen _____ 324—46

WALTER L. CARLSON, Primary Examiner.

FREDERICK M. STRADER, Examiner.